(12) United States Patent
Wan et al.

(10) Patent No.: US 8,588,164 B2
(45) Date of Patent: Nov. 19, 2013

(54) METHOD AND APPARATUS FOR ESTIMATING DOWNLINK CHANNEL QUALITY

(75) Inventors: Lei Wan, Shenzhen (CN); Qiang Li, Shenzhen (CN); Liang Xia, Shenzhen (CN); Jingyuan Sun, Shanghai (CN); Jianguo Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 159 days.

(21) Appl. No.: 13/235,023

(22) Filed: Sep. 16, 2011

(65) Prior Publication Data

US 2012/0057484 A1 Mar. 8, 2012

Related U.S. Application Data

(63) Continuation of application No. PCT/CN2009/070852, filed on Mar. 17, 2009.

(51) Int. Cl.
*H04W 4/00* (2009.01)
*H04B 1/00* (2006.01)

(52) U.S. Cl.
USPC ............................ 370/329; 455/63.1

(58) Field of Classification Search
None
See application file for complete search history.

(56) References Cited

U.S. PATENT DOCUMENTS

| | | | |
|---|---|---|---|
| 6,137,991 A | 10/2000 | Isaksson | |
| 2004/0208138 A1* | 10/2004 | Hayashi et al. | 370/286 |
| 2006/0046738 A1 | 3/2006 | Guan et al. | |
| 2007/0082619 A1 | 4/2007 | Zhang et al. | |
| 2009/0181708 A1* | 7/2009 | Kim et al. | 455/501 |
| 2010/0098030 A1 | 4/2010 | Wang et al. | |
| 2010/0113078 A1* | 5/2010 | Farajidana et al. | 455/507 |
| 2011/0211485 A1 | 9/2011 | Xu et al. | |
| 2011/0274099 A1* | 11/2011 | Kwon et al. | 370/338 |

FOREIGN PATENT DOCUMENTS

| | | |
|---|---|---|
| CN | 1240560 A | 1/2000 |
| CN | 1744750 A | 3/2006 |
| CN | 101282564 A | 10/2008 |
| CN | 101325741 A | 12/2008 |
| EP | 1863205 A2 | 12/2007 |
| WO | WO 2006/068748 A2 | 6/2006 |

OTHER PUBLICATIONS

Extended European Search Report issued in corresponding European Patent Application No. 09841701.7, mailed Oct. 5, 2012.

(Continued)

*Primary Examiner* — Eunsook Choi
(74) *Attorney, Agent, or Firm* — Brinks Gilson & Lione

(57) ABSTRACT

The present invention provides a method includes: receiving a downlink channel quality indicator or an interference indicator, where the downlink channel quality indicator or the interference indicator is fed back by a UE; estimating a weak interference noise matrix of the UE according to the downlink channel quality indicator or the interference indicator, where the downlink channel quality indicator or the interference indicator is fed back by the UE; obtaining a time-frequency channel matrix of a serving cell and a time-frequency strong interference matrix of a strong interfering cell, and obtaining a time-frequency interference noise matrix of the UE according to the estimated weak interference noise matrix and the time-frequency strong interference matrix; and estimate downlink channel quality according to the time-frequency channel matrix and the time-frequency interference noise matrix.

13 Claims, 3 Drawing Sheets

(56) References Cited

OTHER PUBLICATIONS

Samsung, "Discussions on CoMP SU-MIMO" Agenda Item 12.2, 3GPP TSG RAN WG1 Meeting #56. Athens, Greece, Feb. 9-13, 2009. R1-090613.

CATT, "Analysis of CQI/PMI Feedback for Downlink CoMP" Agenda Item 12.2, 3GPP TSG WG1 meeting #56. Athens, Greece, Feb. 2009. R1-090941.

LG Electronics, "UE Measurement and Feedback for DL CoMP" Agenda Item 15.2, 3GPP TSG RAN WG1 Meeting #56bis. Seoul, Korea, Mar. 16-20, 2009. R1-091193.

Written Opinion of the International Searching Authority issued in corresponding PCT Patent Application No. PCT/CN2009/070852, mailed Dec. 31, 2009.

International Search Report issued in corresponding PCT Patent Application No. PCT/CN2009/070852, mailed Dec. 31, 2009.

\* cited by examiner

METHOD AND APPARATUS FOR ESTIMATING DOWNLINK CHANNEL QUALITY

This application is a continuation of International Application No. PCT/CN2009/070852, filed on Mar. 17, 2009, which is hereby incorporated by reference in this entirety.

FIELD OF THE INVENTION

The present invention relates to the wireless communications technology field, and in particular, to a method and an apparatus for estimating downlink channel quality.

BACKGROUND OF THE INVENTION

To schedule radio resources in an efficient manner, a network equipment needs to obtain adequate and accurate downlink channel state information, which mainly includes signal-interference-noise ratio (SINR, signal-interference-noise ratio) information on all frequency bands. To obtain the SINR information, a current LTE R8 specifies that the SINR information should be measured and reported by a user equipment (UE).

The process of measuring and reporting the SINR information mainly includes: The network equipment sends a certain reference signal used for measuring a downlink channel to a UE in a coverage area; after receiving the downlink reference signal, the UE obtains downlink channel state information (CSI, channel state information) through measurement and calculation; the UE calculates downlink SINR on all the frequency bands according to measured channel response and interference information, quantizes the measured downlink SINR into a channel quality indication (CQI, Channel Quality Indication) according to a certain rule, and feeds back the CQI to the network equipment.

During the implementation of the present invention, the inventor discovers that the network equipment mainly schedules radio resources according to the CQI fed back by the UE. Therefore, whether the feedback information is correct directly decides the accuracy and efficiency of the scheduling. From one aspect, because the downlink SINR varies with the time domain and frequency domain, the SINR needs to be cut into multiple sub-bands in the frequency domain, and the CQIs of multiple sub-bands need to be fed back in order to obtain an accurate CQI. In addition, to trace time change features of the SINR, the UE needs to feed back the CQI periodically. Therefore, uplink overheads are increased.

SUMMARY OF THE INVENTION

Embodiments of the present invention provide a method and an apparatus for estimating downlink channel quality, so that a network estimates downlink channel quality directly, therefore feedback overheads of a UE are greatly saved.

Specifically, an embodiment of the present invention provides a method for estimating downlink channel quality, where the method includes: receiving a downlink channel quality indicator or an interference indicator, where the downlink channel quality indicator or the interference indicator is fed back by a UE; estimating a weak interference noise matrix of the UE according to the downlink channel quality indicator or the interference indicator, where the downlink channel quality indicator or the interference indicator is fed back by the UE; obtaining a time-frequency channel matrix of a serving cell and a time-frequency strong interference matrix of a strong interfering cell, and obtaining a time-frequency interference noise matrix of the UE according to the estimated weak interference noise matrix and the time-frequency strong interference matrix; and estimating downlink channel quality according to the time-frequency channel matrix and the time-frequency interference noise matrix.

An embodiment of the present invention provides a network equipment, including: an indicator receiving unit, configured to receive a downlink channel quality indicator or an interference indicator, where the downlink channel quality indicator or the interference indicator is fed back by a UE; a weak interference noise estimating unit, configured to estimate a weak interference noise matrix of the UE according to the downlink channel quality indicator or the interference indicator, where the downlink channel quality indicator or the interference indicator is fed back by the UE; a time-frequency matrix obtaining unit, configured to: obtain a time-frequency channel matrix of a serving cell and a time-frequency strong interference matrix of a strong interfering cell, and obtain a time-frequency interference noise matrix of the UE according to the estimated weak interference noise matrix and the time-frequency strong interference matrix; and a channel quality estimating unit, configured to estimate downlink channel quality according to the time-frequency channel matrix and the time-frequency interference noise matrix.

An embodiment of the present invention provides a UE, including: an indicator obtaining unit, configured to obtain a downlink channel quality indicator or an interference indicator; and a feedback unit, configured to feed back the indicator obtained by the indicator obtaining unit to a network equipment.

It can be known from the preceding technical solutions that, the network equipment receives the downlink channel quality indicator or the interference indicator, where the downlink channel quality indicator or the interference indicator is fed back by the UE, and estimates the weak interference noise matrix of the UE according to the indicator fed back by the UE. Because the weak interference noise matrix changes slowly on the time frequency, the downlink channel quality may be estimated according to the time-frequency channel matrix of the serving cell and the time-frequency strong interference matrix of the strong interfering cell that are obtained by the network equipment as well as the weak interference noise matrix estimated at the time of feedback. Meanwhile, because the indicator fed back by the UE is used to estimate the weak interference noise matrix only, the time change features of the SINR do not need to be traced, and low requirements are imposed on the granularity and accuracy of the feedback indicator, therefore feedback overheads of the UE are greatly saved.

BRIEF DESCRIPTION OF THE DRAWINGS

To illustrate the technical solutions according to the embodiments of the present invention or in the prior art more clearly, accompanying drawings for describing the embodiments or the prior art are given briefly below. Apparently, the accompanying drawings in the following description are only some embodiments of the present invention, and persons skilled in the art may derive other drawings from the accompanying drawings without creative efforts.

DETAILED DESCRIPTION OF THE EMBODIMENTS

For better understanding of the objective, technical solutions and advantages of the present invention, the following describes the technical solutions of present invention in detail with reference to the accompanying drawings and exemplary embodiments. Obviously, the described embodiments are only part of rather than all of the embodiments of the present invention. Persons skilled in the art may derive other embodiments from the embodiments of the present invention without making creative efforts, and all such embodiments shall fall within the protection scope of the present invention.

Figure 1:
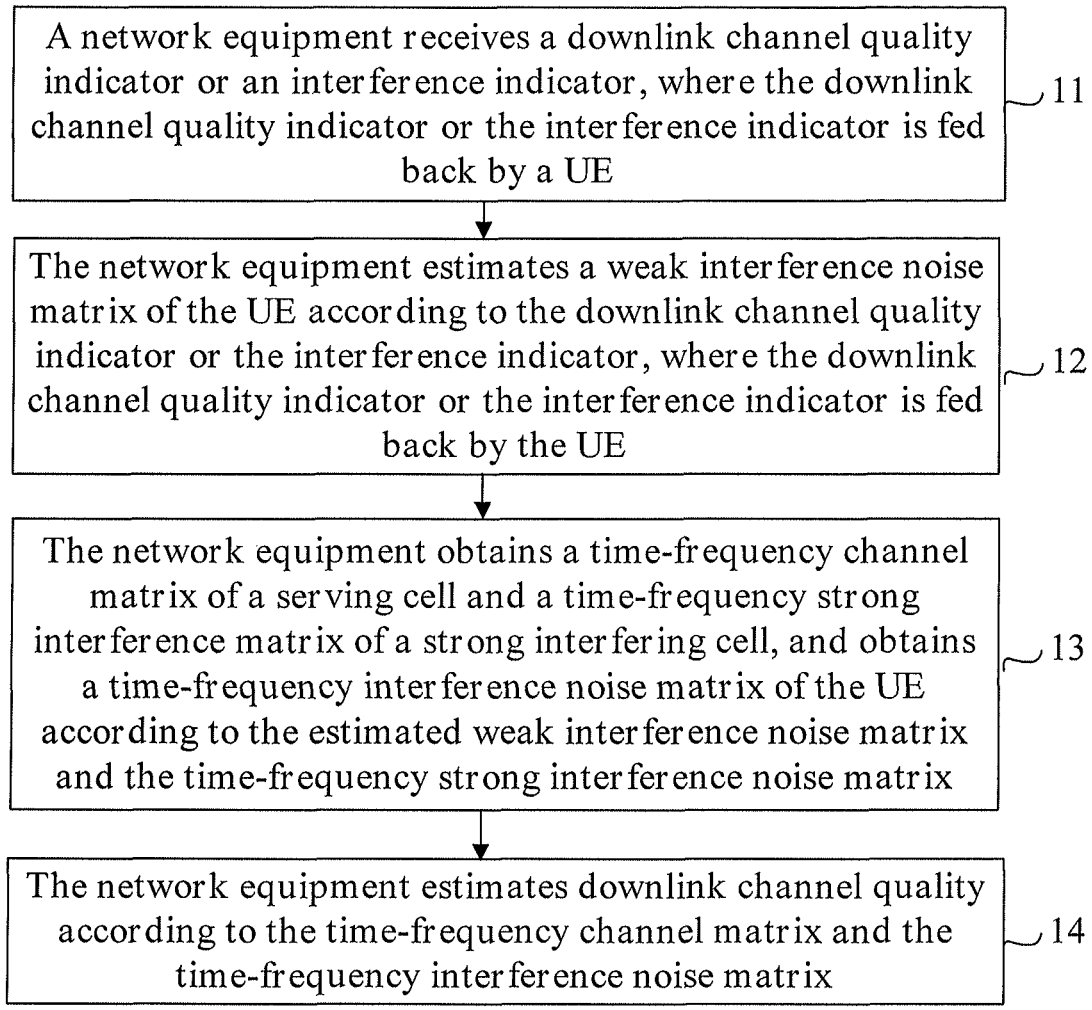
FIG. 1 is a schematic flowchart of a method for estimating downlink channel quality according to an embodiment of the present invention.

As shown in FIG. 1, an embodiment of the present invention provides a method for estimating downlink channel quality, where the method includes the following steps:

Step 11: A network equipment receives a downlink channel quality indicator or an interference indicator, where the downlink channel quality indicator or the interference indicator is fed back by a UE.

Step 12: The network equipment estimates a weak interference noise matrix of the UE according to the downlink channel quality indicator or the interference indicator, where the downlink channel quality indicator or the interference indicator is fed back by the UE.

Step 13: The network equipment obtains a time-frequency channel matrix of a serving cell and a time-frequency strong interference matrix of a strong interfering cell, and obtains a time-frequency interference noise matrix of the UE according to the estimated weak interference noise matrix and the time-frequency strong interference matrix.

Step 14: The network equipment estimates downlink channel quality according to the time-frequency channel matrix and the time-frequency interference noise matrix.

In step 11, if the network equipment receives a downlink channel quality indicator fed back by the UE, the UE may obtain a CQI of one or multiple serving cells in a measurement set before the feedback, and feed back a broadband CQI to the network equipment in a feedback mode combining the broadband CQI, a sub-band precoding matrix indicator (PMI, Precoding Matrix Indicator), and a rank indicator (RI, Rank Indicator). In addition, a feedback period of the broadband CQI may be longer than or equal to feedback periods of the sub-band PMI and the RI.

In step 12, when receiving the broadband CQI fed back by the UE, the network equipment obtains a strong interference matrix of the UE; assuming that an equivalent weak interference noise matrix of the UE is a real diagonal matrix, the network equipment obtains an equivalent interference noise matrix according to the equivalent weak interference noise matrix and the strong interference matrix, calculates a diagonal line value of the equivalent weak interference noise matrix by performing a reverse operation on the broadband CQI fed back by the UE, and estimates the weak interference noise matrix of the UE according to the diagonal line value of the equivalent weak interference noise matrix.

In step 11, if the network equipment receives an interference indicator fed back by the UE, the UE estimates the downlink channel and calculates an interference noise matrix coming from another cell and a background noise according to a downlink reference signal of an anchor cell before the feedback. Then, the UE takes out one or multiple diagonal line elements from the interference noise matrix, quantizes the diagonal line elements, and feeds back the quantized diagonal line elements to the network equipment.

In step 12, after receiving the quantized diagonal line elements fed back by the UE, the network equipment calculates a strong interference matrix of the UE according to the downlink CSI of the strong interfering cell of the UE at this time; the network equipment eliminates the strong interference matrix from the diagonal line elements, and estimates the weak interference noise matrix of the UE according to the remaining diagonal line elements.

In the method for estimating downlink channel quality provided in this embodiment of the present invention, the network equipment receives the downlink channel quality indicator or the interference indicator, where the downlink channel quality indicator or the interference indicator is fed back by the UE, estimates the weak interference noise matrix of the UE according to the indicator fed back by the UE. Because the weak interference noise matrix changes slowly on the time frequency, the downlink channel quality may be estimated according to the weak interference noise matrix estimated at the time of feedback, and the time-frequency channel matrix of the serving cell and the time-frequency strong interference matrix of the strong interfering cell that are obtained by the network equipment. Meanwhile, because the indicator fed back by the UE is used to estimate the weak interference noise matrix only, the time change features of the SINR do not need to be traced, and low requirements are imposed on the granularity and accuracy of the feedback indicator, therefore feedback overheads of the UE are greatly saved.

In addition, the network may overcome the weakness of an original CQI feedback according to the obtained downlink CSI on a time-frequency resources, and estimate the channel quality with fine granularity and high accuracy.

Furthermore, after new features are introduced to an LTE+ system, for example, when a coordinated multiple point transmission and reception (CoMP, coordinated multiple point transmission and reception) mode or a multiple-user multiple-input multiple-output (MU-MIMO, Multiple-User Multiple-Input Multiple-Output) mode is used, the UE may still feed back the broadband CQI of a single cell only, therefore the compatibility of the UE is kept and the implementation is simplified.

Figure 2:
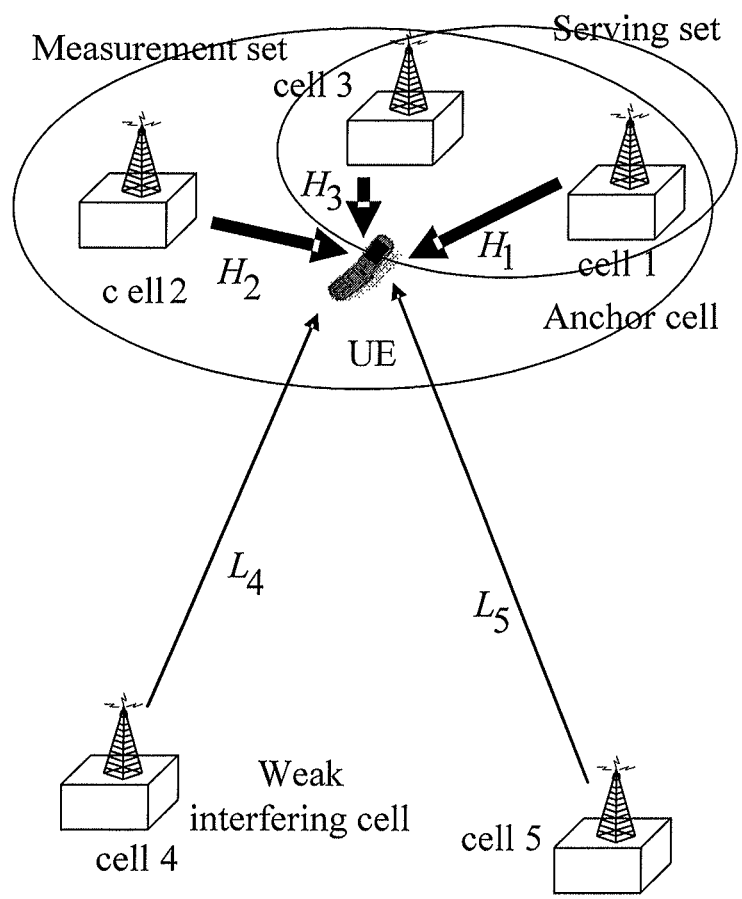
FIG. 2 is a schematic diagram of a wireless communications system according to an embodiment of the present invention.

A wireless communications system is as shown in FIG. 2. In a CoMP mode, a Cell 1 and a Cell 3 serve a UE concurrently and form a serving set of the UE. Besides the serving cell, the UE also suffers from interference of a Cell 2, which is a strong interfering cell. A strong interfering cell is defined as a non-anchor cell or a non-serving cell whose large scale fading with the UE is lower than a threshold. The Cell 1, Cell 2, and Cell 3 form a measurement set of the UE. A Cell 4 and a Cell 5 are weak interfering cells of the UE.

For simplicity of description, the following description is based on the following assumptions: The UE has two receiving antennas, an eNB has four transmitting antennas, each UE transmits a maximum of two data streams concurrently, and each UE feeds back CQIs of L (L=1, 2) streams. To simplify the implementation of the UE, the UE still estimates and feeds back the CQI of a single serving cell (the Cell 1 acts as the serving cell). The eNB calculates an interference matrix of the UE according to the downlink CSI between the cells (Cell 1, Cell 2 and Cell 3) and the UE, and re-calculates the SINR and the CQI served by both the Cell 1 and Cell 3.

This embodiment includes the following steps:

Step 21: An UE calculates an SINR by using a minimum mean square error (k, Minimum Mean Square Error) algorithm only according to a downlink channel, a PMI that are of a Cell 1, and a received signal without taking multiple serving cells into consideration. The calculation method is as follows:

$$\tilde{H} = H_1 p_1 \qquad (1)$$

$$R_{I,N} = \sum_{k=2}^{5} E_s H_k H_k^H + E(nn^H) \qquad (2)$$

$$\beta_i = \tilde{h}_i^H \left( \tilde{H} \tilde{H}^H + E_s^{-1} R_{I,N} \right)^{-1} \tilde{h}_i \qquad (3)$$

$$SINR_i = E_s \frac{\beta_i}{1 - \beta_i} \qquad (4)$$

In the preceding formula, $H_k$ refers to a downlink channel matrix between a cell k (k=2, 3, 4, 5) and the UE, $P_1$ refers to a precoding matrix when the Cell 1 serves the UE, n refers to a noise signal vector, E(●) refers to the mathematic expectation operation, $R_{I,N}$ refers to an interference noise matrix, $\tilde{h}_i$ refers to the $i^{th}$ row of the $\tilde{H}$, and $E_s$ refers to a transmit signal power (assume that $E_s$=1 in this embodiment).

Step 22: The UE quantizes the SINR obtained in step 21 into a CQI, and feeds back the CQI to an eNB.

Step 23: After receiving the CQI, the eNB calculates a strong interference matrix $\hat{R}_I$ of the UE according to the downlink CSI between multiple strong interfering cells (Cell 2 and Cell 3) and the UE at this time, and calculates a weak interference noise matrix $\hat{R}_N$ of the UE according to the CQI information obtained in step 22.

Specifically, step 23 further includes:

Step 231: When receiving the CQI fed back by the UE, the eNB obtains the downlink CSI $H_j$ (j=2, 3) between two strong interfering cells (Cell 2 and Cell 3) of the anchor cell of the UE and the UE, and calculates a strong interference matrix corresponding to the interference that the two strong interfering cells impose on the UE.

$$\hat{R}_I = \sum_{j=2}^{3} H_j H_j^H \qquad (5)$$

The eNB maps the CQI corresponding to L streams fed back by the UE to $\overline{SINR_i}$ (i=1, . . . , L) by performing a reverse operation from the SINR to the CQI, where the $\overline{SINR_i}$ refers to the SINR obtained through feedback and is a quantized value of the SINR measured by the UE.

The eNB generates $\tilde{H} = H_1 P_1$ according to the downlink CSI $H_1$ between the anchor cell and the UE and the precoding matrix $P_1$, and lets the $\tilde{h}_i$ to be the $i^{th}$ row of the $\tilde{H}$.

Step 232: Interference signals come from a Cell 4 and Cell 5 are weak interference signals. It may be assumed that a weak interference matrix corresponding to these interference signals is a real diagonal matrix.

$$\sum_{s=4}^{5} H_s H_s^H \approx \sum_{s=4}^{5} L_s I \qquad (6)$$

In the preceding formula, L, refers to the large scale fading between a cell (s=4, 5) and the UE, and I refers to a unit matrix.

A noise matrix E($nn^H$) is also assumed to be a diagonal matrix. Therefore, an equivalent noise matrix may be assumed to be as follows:

$$\hat{R}_N = \begin{bmatrix} \sigma_1^2 & 0 \\ 0 & \sigma_2^2 \end{bmatrix} \approx \sum_{s=4}^{5} H_s H_s^H + E(nn^H) \qquad (7)$$

Therefore, the eNB obtains the equivalent interference noise matrix:

$$\hat{R}_{I,N} = \hat{R}_I + \hat{R}_N \qquad (8)$$

In the preceding formula, L (L=1, 2) unknown numbers are included.

Let $R_{I,N} = \hat{R}_{I,N}$, and apply the $R_{I,N}$, $\tilde{H}$, $\tilde{h}_i$, and $\overline{SINR_i}$ into formulas (3) and (4). Then a formula group consisting of L formulas is obtained, which includes L unknown numbers. According to the formula group, $\sigma_1^2$ and $\sigma_2^2$; may be calculated. If L is equal to 1, $\sigma_1^2 = \sigma_2^2$.

The eNB estimates the weak interference noise matrix of the UE according to diagonal line values $\sigma_1^2$ and $\sigma_2^2$ of the equivalent weak interference noise matrix.

Step 24: On a time-frequency resource, the eNB obtains the downlink CSI and corresponding precoding matrix and scheduling information that are of the serving cells (Cell 1 and Cell 3) of the UE, and the downlink CSI of the strong interfering cell (Cell 2) and the weak interference noise matrix $\hat{R}_N$ obtained in step 23, calculates the SINR of the UE on the time-frequency resource according to such information, and quantizes the SINR into a CQI.

Specifically, step 24 further includes:

Step 241: The eNB obtains the downlink CSI between the strong interfering cell (Cell 2) of the serving cell of the UE and the UE on a scheduled time-frequency resource, and calculates a time-frequency strong interference matrix that Cell 2 imposes on the UE.

$$\hat{R}_1(t,f) = H_2(t,f) H_2^H(t,f) \qquad (9)$$

Assuming a macro diversity transmission mode of the CoMP is used, two serving cells (Cell 1 and Cell 3) send same data to the UE (if another CoMP mode is used, the following method for calculating the time-frequency channel matrix $\tilde{H}$(t,f) may be changed accordingly).

The eNB generates a time-frequency channel matrix according to the downlink CSI $H_1$(t,f) and $H_3$(t,f) between the serving cell and the UE and precoding matrixes $P_1$(t,f) and $P_3$(t,f).

$$\tilde{H}(t,f) = H_1(t,f) P_1(t,f) + H_3(t,f) P_3(t,f) \qquad (10)$$

Let $\tilde{h}_i$(t,f) to be the $i^{th}$ row of the $\tilde{H}$(t,f).

Step 242: Because the weak interference noise matrix $\hat{R}_N$ corresponding to the weak interference signal coming from another interfering cell changes slowly in the time domain and the frequency domain, the $\hat{R}_N$ on the time-frequency resource may be considered as equal to the $\hat{R}_N$ calculated in step 23.

The time-frequency interference noise matrix obtained by the eNB is calculated as follows:

$$\hat{R}_{I,N}(t,f) = \hat{R}_I(t,f) + \hat{R}_N \qquad (11)$$

Let $R_{I,N} = \hat{R}_{I,N}$(t,f), apply the $R_{I,N}$ and $\tilde{H}$, $\tilde{h}_i$(t,f) to formulas (3) and (4), and obtain the SINR on the time-frequency resource.

Step 243: The eNB quantizes the SINR obtained in step 242 into a CQI.

Then the estimation of downlink channel quality on the network is implemented.

The following is a supplement to this embodiment of the present invention.

1. In step 23 and step 24, the eNB needs to use the downlink CSI between all the cells (Cell 1, Cell 2, and Cell 3) in the measurement set and the UE. In a time division duplex (TDD) system, the eNB may obtain the information through the reciprocity between the uplink channel and the downlink channel. In a frequency division duplex (FDD) system, the eNB may obtain the information through quantizing and feeding back the downlink channel by the UE or through other means.

2. The algorithm used by the UE to detect the SINR is not limited to the MMSE algorithm. When another detection algorithm is used, the weak interference matrix $\hat{R}_N$ and the CQI may still be estimated so long as the eNB and the UE use the same algorithm in step 23 and step 24.

3. The CQI fed back by the UE is not limited to the CQI of an anchor cell that serves the UE only, and may also be the CQI of any one or multiple cells that serves the UE concurrently in a measurement set of the UE. The weak interference matrix $\hat{R}_N$ may be estimated so long as the eNB changes the $\tilde{H}$ and the selection of the strong interfering cell in step 23.

4. The CQI fed back by the UE is only used to estimate the weak interference noise matrix $\hat{R}_N$, and the $\hat{R}_N$ changes slowly in the time domain and the frequency domain. Therefore, when this method is used to calculate the CQI on the eNB side, a feedback period of the CQI fed back by the UE may be long, and the granularity of the CQI that the UE measures in the frequency domain may be large.

For example, an LTE R8 specification provides a feedback mode as follows: sub-band CQI+sub-band PMI+RI, where a feedback period of the sub-band CQI is shorter than feedback periods of the RI and the sub-band PMI. However, in this embodiment, the feedback mode may be adjusted as follows: broadband CQI+sub-band PMI+RI. In addition, a feedback period of the broadband CQI may exceed the feedback periods of the PMI and the RI.

Still refer to the wireless communications system shown in FIG. 2. For simplicity of description, the following description is based on the assumptions: A UE has two receiving antennas, an eNB has four transmitting antennas, each UE transmit a maximum of two data streams concurrently, and each UE feeds back CQI of L (L=1, 2) streams. To simplify the implementation of the UE, the UE still estimates and feeds back the CQI of a single serving cell (a Cell 1 acts as the serving cell); the eNB calculates a strong interference matrix of the UE according to the downlink CSI between the cells (Cell 1, Cell 2 and Cell 3) and the UE, and re-calculates the SINR and the CQI served by both the Cell 1 and Cell 3.

The method provided in this embodiment includes the following steps:

Step 31: A UE estimates a downlink channel according to a downlink reference signal of an anchor cell, and calculates an interference noise matrix coming from another cell and a background noise.

$$y = \tilde{H}x_1 + \sum_{k=2}^{5} H_k x_k + n \quad (12)$$

$$R_{I,N} = E(yy^H) - E_s H_1 H_1^H = \sum_{k=2}^{5} E_s H_k H_k^H + E(nn^H) \quad (13)$$

In the preceding formulas, y refers to a received signal vector of the UE, and $x_k$ refers to a transmit signal vector of a cell k (k=2, 3, 4, 5).

Step 32: The UE takes out one or multiple diagonal line elements from the interference noise matrix in step 31, quantizes the diagonal line elements, and feeds back the quantized diagonal line elements to the eNB. In this embodiment, the UE may quantize and feed back the first diagonal line element $(R_{I,N})_{11}$.

Step 33: After receiving the diagonal line elements of the interference noise matrix fed back by the UE, the eNB calculates a strong interference matrix $$\hat{R}_I = \sum_{j=2}^{3} H_j H_j^H$$

of the UE according to the downlink CSI between the strong interference cells (Cell 2 and Cell 3) of the UE and the UE at this time, and estimates a weak interference noise matrix $$\hat{R}_N = \left( \sum_{s=4}^{5} |L_s|^2 + \sigma_n^2 \right) I$$

according to the remaining interference excluding the strong interference. Because the remaining interference is a unit matrix and has only one unknown number, the following formula may be easily obtained:

$$\left( \sum_{s=4}^{5} |L_s|^2 + \sigma_n^2 \right) = (R_{I,N})_{11} - \left( \sum_{i=2}^{3} H_i H_i^H \right)_{11} \quad (14)$$

The result of the preceding formula is a value that is non-selective in the frequency domain and changes slowly in the time domain. The eNB re-combines the calculated remaining interference and the downlink channel of the strong interfering cell obtained on a real-time basis into a time-frequency interference noise matrix $\hat{R}_{I,N}(t,f) = \hat{R}_I(t,f) + \hat{R}_N$.

Step 34: On a time-frequency resource, the eNB obtains the downlink CSI of the serving cells (Cell 1 and Cell 3) of the UE and corresponding precoding matrix, scheduling information, downlink CSI of the strong interference cell (Cell 2), and the interference noise matrix $\hat{R}_{I,N}(t,f)$ obtained in step 33, calculates the SINR of the UE on this time-frequency resource according to the information, and quantizes the SINR into a CQI.

It should be noted that, similar to the preceding embodiment, because the diagonal elements of the interference noise matrixes are only used to estimate the weak interference matrix $\hat{R}_N$, and the $\hat{R}_N$ changes slowly in the time domain and the frequency domain, the interference matrix diagonal elements measured and fed back by the UE needs only to feed back a broadband measurement value on the whole frequency band. In addition, the feedback period may be very long.

In the method provided in the embodiment of the present invention, the overheads of the CQI that the UE needs to feed back may be greatly saved. In addition, the weakness of an original CQI feedback may be overcome, and the channel quality with fine granularity and high accuracy may be estimated. Furthermore, after new features are introduced to an LTE+ system, for example, in the CoMP mode or MU-MIMO mode, the UE may still feed back only the broadband CQI of a single cell, therefore the compatibility of the UE is kept and the implementation is simplified.

Figure 3:
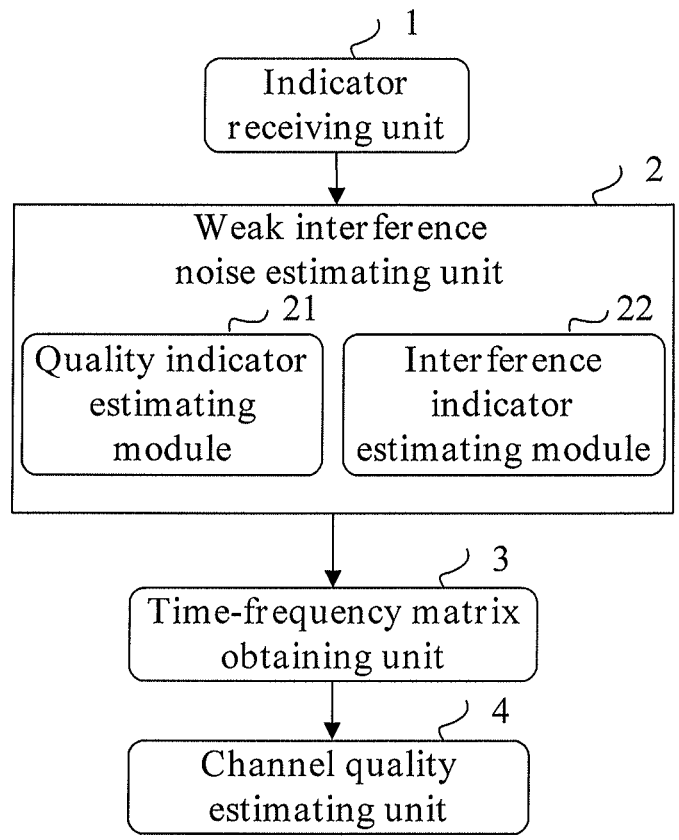
FIG. 3 is a schematic structural diagram of a network equipment according to an embodiment of the present invention.

As shown in FIG. 3, an embodiment of the present invention provides a network equipment, including:

an indicator receiving unit 1, configured to receive a downlink channel quality indicator or an interference indicator, where the downlink channel quality indicator or the interference indicator is fed back by a UE;

a weak interference noise estimating unit 2, configured to estimate a weak interference noise matrix of the UE according to the downlink channel quality indicator or the interference indicator, where the downlink channel quality indicator or the interference indicator is fed back by the UE;

a time-frequency matrix obtaining unit 3, configured to: obtain a time-frequency channel matrix of a serving cell and a time-frequency strong interference matrix of a strong interfering cell, and obtain a time-frequency interference noise matrix of the UE according to the estimated weak interference noise matrix and the time-frequency strong interference matrix; and a channel quality estimating unit 4, configured to estimate downlink channel quality according to the time-frequency channel matrix and the time-frequency interference noise matrix.

The weak interference noise estimating unit 2 includes any one of the following modules:

a quality indicator estimating module 21, configured to: when receiving a broadband CQI fed back by the UE, obtain a strong interference matrix of the UE; assuming the equivalent weak interference noise matrix of the UE is a real diagonal matrix, obtain an equivalent interference noise matrix according to the equivalent weak interference noise matrix and the strong interference matrix; calculate a diagonal line value of the equivalent weak interference noise matrix by performing a reverse operation on the broadband CQI fed back by the UE; and estimate the weak interference noise matrix of the UE according to the diagonal line value of the equivalent weak interference noise matrix;

or, an interference indicator estimating module 22, configured to: after receiving the quantized diagonal line elements of the interference noise matrix fed back by the UE, calculate the strong interference matrix of the UE according to the downlink CSI of the strong interfering cell of the UE at this time; and eliminate the strong interference matrix from the diagonal line elements, and estimate the weak interference noise matrix of the UE according to the remaining diagonal line elements.

The preceding quality indicator estimating module 21 is configured to estimate the weak interference noise when the network equipment receives the downlink channel quality indicator fed back by the UE. The preceding interference indicator estimating module 22 is configured to estimate the weak interference noise when the network equipment receives the interference indicator fed back by the UE. Refer to the foregoing method embodiments for the specific calculation formulas, which are not repeatedly described here.

Figure 4:
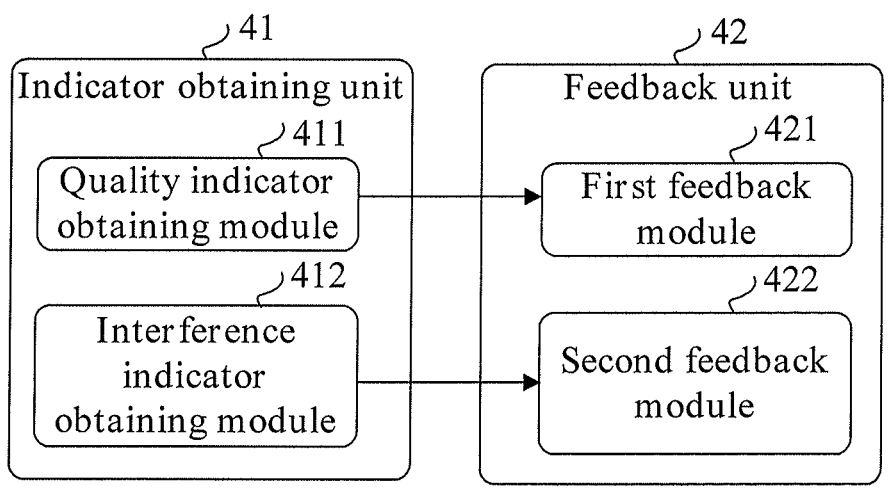
FIG. 4 is a schematic structural diagram of a UE according to an embodiment of the present invention.

As shown in FIG. 4, an embodiment of the present invention provides a UE, including:

an indicator obtaining unit 41, configured to obtain a downlink channel quality indicator or an interference indicator; and a feedback unit 42, configured to feed back the indicator obtained by the indicator obtaining unit to a network equipment.

The indicator obtaining unit 41 includes any one of the following modules:

a quality indicator obtaining module 411, configured to obtain a CQI of one or multiple serving cells in a measurement set; or, an interference indicator obtaining module 412, configured to obtain one or multiple diagonal line elements in an interference noise matrix of an anchor cell.

The feedback unit 42 includes any one of the following modules:

a first feedback module 421, configured to feed back the CQI obtained by the quality indicator obtaining module to the network equipment in a feedback mode combining a broadband CQI, a sub-band PMI, and an RI; or a second feedback module 422, configured to: quantize the one or multiple diagonal line elements obtained by the interference indicator obtaining module, and feed back the quantized diagonal line elements to the network equipment.

The network equipment receives the downlink channel quality indicator or the interference indicator, where the downlink channel quality indicator or the interference indicator is fed back by the UE, estimates a weak interference noise matrix of the UE according to the indicator fed back by the UE. Because the weak interference noise matrix changes slowly on the time frequency, the downlink channel quality may be estimated according to a time-frequency channel matrix of a serving cell and a time-frequency strong interference matrix of a strong interfering cell that are obtained by the network equipment as well as the weak interference noise matrix estimated at the time of feedback. Meanwhile, the indicator fed back by the UE is used to estimate the weak interference noise matrix only, the time change features of the SINR do not need to be traced, and low requirements are imposed on the granularity and accuracy of the feedback indicator, therefore feedback overheads of the UE are greatly saved.

In addition, the network may overcome the weakness of an original CQI feedback according to the obtained downlink CSI on a time-frequency resource, and estimate the channel quality with fine granularity and high accuracy. Furthermore, after new features are introduced to an LTE+ system, for example, when a CoMP mode or MU-MIMO mode is used, the UE may still feed back only the broadband CQI of a single cell, therefore the compatibility of the UE is kept and the implementation is simplified.

The technical solutions provided in the embodiments of the present invention may be applied in all wireless communications systems that perform scheduling selectively by using the time domain and frequency domain based on the CSI.

Finally, it should be noted that it is understandable to those skilled in the art that all or part of the steps in the foregoing embodiments may be implemented by a program instructing relevant hardware. The program may be stored in a computer readable storage medium. When the program is executed, the processes of the preceding methods are executed. The storage medium may be a magnetic disk, a Compact Disk Read-Only Memory (CD-ROM), a Read-Only Memory (ROM) or a Random Access Memory (RAM).

In addition, the functional units in the embodiments of the present invention may be integrated in one processing module, or each unit is separate from each other physically, or two or more units are integrated in one processing module. The integrated module may be embodied in the form of hardware or a software functional module. If the integrated module is embodied in the form of a software functional module and is sold or used as a separate product, the integrated module may also be stored in a computer readable storage medium. The foregoing storage medium may be a ROM, a magnetic disk or a CD-ROM.

The foregoing detailed embodiments are not used to limit the present invention. It is apparent that those skilled in the art may make various modifications, equivalent replacements, and improvements to the present invention without departing from the principle. The modifications, equivalent replacements, and improvements should fall within the protection scope of the present invention.

What is claimed is:

1. A method for estimating downlink channel quality, comprising:
    receiving a downlink channel quality indicator or an interference indicator, wherein the downlink channel quality indicator or the interference indicator is fed back by a user equipment (UE);
    estimating a weak interference noise matrix of the UE according to the downlink channel quality indicator or the interference indicator, wherein the downlink channel quality indicator or the interference indicator is fed back by the UE;
    obtaining a time-frequency channel matrix of a serving cell and a time-frequency strong interference matrix of a strong interfering cell, and obtaining a time-frequency interference noise matrix of the UE according to the estimated weak interference noise matrix and the time-frequency strong interference matrix; and
    estimating downlink channel quality according to the time-frequency channel matrix and the time-frequency interference noise matrix.

2. The method according to claim 1, wherein the receiving the downlink channel quality indicator fed back by the UE comprises:
    receiving a broadband channel quality indication (CQI), wherein the broadband CQI is fed back by the UE to a network equipment in a feedback mode combining the broadband CQI, a sub-band precoding matrix indicator (PMI), and a rank indicator (RI).

3. The method according to claim 2, wherein a feedback period of the broadband CQI is longer than or equal to feedback periods of the sub-band PMI and the RI.

4. The method according to claim 2, wherein the estimating the weak interference noise matrix of the UE according to the downlink channel quality indicator fed back by the UE comprises:
    when the network equipment receives the broadband CQI fed back by the UE, obtaining a strong interference matrix of the UE;
    assuming an equivalent weak interference noise matrix of the UE is a real diagonal matrix, obtaining an equivalent interference noise matrix according to the equivalent weak interference noise matrix and the strong interference matrix;
    calculating a diagonal line value of the equivalent weak interference noise matrix by performing a reverse operation on the broadband CQI fed back by the UE; and
    estimating the weak interference noise matrix of the UE according to the diagonal line value of the equivalent weak interference noise matrix.

5. The method according to claim 1, wherein the receiving the interference indicator fed back by the UE, the method comprises:
    receiving one or multiple diagonal line elements quantized by the UE from the interference noise matrix, wherein the interference noise matrix is the matrix in which the UE estimates a downlink channel according to a downlink reference signal of an anchor cell, and calculates an interference noise matrix coming from another cell and a background noise.

6. The method according to claim 5, wherein the estimating the weak interference noise matrix of the UE according to the interference indicator fed back by the UE comprises:
    after the network equipment receives the quantized diagonal line elements fed back by the UE, calculating a strong interference matrix of the UE according to downlink channel state information (CSI) of the strong interfering cell of the UE; and
    eliminating the strong interference matrix from the diagonal line elements, and estimating a weak interference noise matrix of the UE according to remaining diagonal line elements.

7. A method for estimating downlink channel quality, comprising:
    obtaining a downlink channel quality indicator or an interference indicator;
    feeding back the downlink channel quality indicator or the interference indicator to a network equipment, so that the network equipment estimates a weak interference noise matrix of a user equipment (UE) according to the downlink channel quality indicator or the interference indicator, wherein the downlink channel quality indicator or the interference indicator is fed back by the UE, obtaining a time-frequency channel matrix of a serving cell and a time-frequency strong interference matrix of a strong interfering cell, and obtaining a time-frequency interference noise matrix of the UE according to the estimated weak interference noise matrix and the time-frequency strong interference matrix; and estimating downlink channel quality according to the time-frequency channel matrix and the time-frequency interference noise matrix.

8. The method according to claim 7, wherein the obtaining the downlink channel quality indicator comprises:
    obtaining a channel quality indication (CQI) of one or multiple serving cells in a measurement set;
    wherein the feeding back the downlink channel quality indicator to the network equipment comprises:
    feeding back a broadband CQI to the network equipment in a feedback mode combining the broadband CQI, a sub-band precoding matrix indicator (PMI), and a rank indicator (RI).

9. The method according to claim 8, wherein a feedback period of the broadband CQI is longer than or equal to feedback periods of the sub-band PMI and the RI.

10. The method according to claim 7, wherein the obtaining an interference indicator comprises:
    estimating, by the UE, a downlink channel according to a downlink reference signal of an anchor cell, and calculating an interference noise matrix coming from another cell and a background noise;
    wherein the feeding back the interference indicator to the network equipment comprises:
    taking out one or multiple diagonal line elements from the interference noise matrix, quantizing the one or multiple diagonal line elements, and feeding back the quantized diagonal line elements to the network equipment.

11. A network equipment, comprising:
    an indicator receiving unit, configured to receive a downlink channel quality indicator or an interference indicator, wherein the downlink channel quality indicator or the interference indicator is fed back by a user equipment (UE);

a weak interference noise estimating unit, configured to estimate a weak interference noise matrix of the UE according to the downlink channel quality indicator or the interference indicator, wherein the downlink channel quality indicator or the interference indicator is fed back by the UE;

a time-frequency matrix obtaining unit, configured to: obtain a time-frequency channel matrix of a serving cell and a time-frequency strong interference matrix of a strong interfering cell, and obtain a time-frequency interference noise matrix of the UE according to the estimated weak interference noise matrix and the time-frequency strong interference matrix; and a channel quality estimating unit, configured to estimate downlink channel quality according to the time-frequency channel matrix and the time-frequency interference noise matrix.

12. The network equipment according to claim 11, wherein the weak interference noise estimating unit comprises any one of the following modules:

a quality indicator estimating module, configured to: when receiving a broadband CQI fed back by the UE, obtain a strong interference matrix of the UE; assuming an equivalent weak interference noise matrix of the UE is a real diagonal matrix, obtain an equivalent interference noise matrix according to the equivalent weak interference noise matrix and the strong interference matrix; calculate a diagonal line value of the equivalent weak interference noise matrix according to a reverse operation on the broadband CQI fed back by the UE; and estimate the weak interference noise matrix of the UE according to the diagonal line value of the equivalent weak interference noise matrix; and an interference indicator estimating module, configured to: after receiving quantized diagonal line elements of the interference noise matrix fed back by the UE, calculate the strong interference matrix of the UE according to downlink channel state information (CSI) of the strong interfering cell of the UE; and eliminate the strong interference matrix from the diagonal line elements, and estimate the weak interference noise matrix of the UE according to remaining diagonal line elements.

13. A non-transitory computer readable medium, comprising computer program codes stored thereon, executable by one or more digital processor, wherein the computer program codes comprise instructions for:

receiving a downlink channel quality indicator or an interference indicator, wherein the downlink channel quality indicator or the interference indicator is fed back by a user equipment (UE);

estimating a weak interference noise matrix of the UE according to the downlink channel quality indicator or the interference indicator, wherein the downlink channel quality indicator or the interference indicator is fed back by the UE;

obtaining a time-frequency channel matrix of a serving cell and a time-frequency strong interference matrix of a strong interfering cell, and obtaining a time-frequency interference noise matrix of the UE according to the estimated weak interference noise matrix and the time-frequency strong interference matrix; and estimating downlink channel quality according to the time-frequency channel matrix and the time-frequency interference noise matrix.

* * * * *